(12) United States Patent
Muthiyan et al.

(10) Patent No.: US 6,839,746 B1
(45) Date of Patent: Jan. 4, 2005

(54) STORAGE AREA NETWORK (SAN) DEVICE LOGICAL RELATIONSHIPS MANAGER

(75) Inventors: Abhijit Muthiyan, Cary, NC (US); Russell Thrasher, Graham, NC (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

(21) Appl. No.: 10/453,107

(22) Filed: Jun. 3, 2003

(51) Int. Cl.[7] .............................................. G06F 15/16
(52) U.S. Cl. ..................................... 709/220; 709/223
(58) Field of Search ................................ 709/211–239; 714/1–9; 711/111–112, 114, 161–162

(56) References Cited

U.S. PATENT DOCUMENTS

| | | | |
|---|---|---|---|
| 5,790,775 A | * | 8/1998 | Marks et al. ................... 714/9 |
| 6,598,174 B1 | * | 7/2003 | Parks et al. ..................... 714/6 |
| 6,754,718 B1 | * | 6/2004 | Dobberpuhl et al. ......... 709/250 |
| 6,792,557 B1 | * | 9/2004 | Takamoto et al. .............. 714/7 |
| 2003/0005119 A1 | | 1/2003 | Mercier et al. ............. 709/225 |
| 2003/0212711 A1 | * | 11/2003 | Fujibayashi et al. ........ 707/200 |
| 2003/0229689 A1 | * | 12/2003 | Raghavan et al. .......... 709/223 |
| 2004/0010600 A1 | * | 1/2004 | Baldwin et al. ............ 709/229 |
| 2004/0039756 A1 | * | 2/2004 | Bromley ..................... 707/200 |
| 2004/0049564 A1 | * | 3/2004 | Ng et al. ..................... 709/223 |
| 2004/0078599 A1 | * | 4/2004 | Nahum ....................... 713/201 |

* cited by examiner

*Primary Examiner*—Nasser Moazzami
(74) *Attorney, Agent, or Firm*—Moser, Patterson & Sheridan, LLP

(57) ABSTRACT

A method and apparatus for managing one or more logical relationships between a plurality of devices in a storage area network (SAN). The method includes receiving a first identifier associated with a first SAN device, determining the logical relationships associated with the first SAN device, receiving a second identifier associated with a second SAN device, and associating the second identifier to the logical relationships associated with the first SAN device.

20 Claims, 3 Drawing Sheets

STORAGE AREA NETWORK (SAN) DEVICE LOGICAL RELATIONSHIPS MANAGER

BACKGROUND OF THE INVENTION

1. Field of the Invention

Embodiments of the present invention generally relate to storage management, and more particularly, to software used in storage management.

2. Description of the Related Art

In the past, large organizations relied heavily on parallel Small Computer System Interface (SCSI) technology to provide the performance required for their enterprise data storage needs. More recently, organizations are recognizing that the restrictions imposed by SCSI architecture are too costly for SCSI to continue as a viable enterprise storage solution. Such restrictions include the following:

SCSI disk arrays must be located no more than 25 meters from the host server;

The parallel SCSI bus is susceptible to data errors resulting from slight timing discrepancies or improper port termination; and SCSI array servicing frequently requires downtime for every disk in the array.

One solution has been to create technology that enables storage arrays to reside directly in the network, where disk accesses may be made directly rather than through the server's SCSI connection. This network-attached storage (NAS) model eliminates SCSI's restrictive cable distance, signal timing, and termination requirements. However, this model adds a significant load to the network, which frequently is already starved for bandwidth. Gigabit Ethernet technology only alleviates this bottleneck for the short term, and thus, a more elegant solution is desirable.

The storage area network (SAN) model places storage on its own dedicated network, removing data storage from both the server-to-disk SCSI bus and the main user network. This dedicated network most commonly uses Fiber Channel technology, a versatile, high-speed transport. The SAN includes one or more hosts that provide a point of interface with local area network (LAN) users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The connectivity between a host and a storage device is typically defined as a route. The SAN fabric may enable server-to-storage device connectivity through Fiber Channel switching technology to a wide range of servers and storage devices. The versatility of the SAN model enables organizations to perform tasks that were previously difficult to implement, such as LAN-free and server-free tape backup, storage leasing, and full-motion video services.

Each SAN device, such as a host bus adapter, is generally tagged with a unique identifier, such as a world wide name (WWN), which is a 64-bit identifier. The identifier is generally burned on the device during manufacture. The identifier is generally used to assist with SAN management, including compartmentalization, authorization and securitization. The identifier is also used to associate the device with various logical relationships, such as zones and logical unit number (LUN) masks.

When a device fails and is replaced with a new device, the logical relationships associated with the failed device is modified or reconfigured with an identifier associated with the new device. This can be an arduous task for the user or system administrator, considering that the new identifier may have to be entered manually one digit at a time, each logical relationship may be with a different entity/device, each entity/device may be from a different vendor, and each vendor may require its own proprietary configuration tool or may require access through a proprietary application programming interface (API). For example, a host bus adapter (HBA) that is zoned with a BROCADED switch may only be configured using BROCADE's proprietary switch configuration tool or a tool based on Brocade's proprietary API's. Likewise, an HBA that is LUN masked with an EMC® array may only be configured using EMC's proprietary array configuration tool or a tool based on EMC's proprietary API's. In this manner, the user is required to use a number of different configuration tools to reconfigure the logical relationships with the new device identifier. As a result, modifying or reconfiguring logical relationships of the failed device with the new device identifier may become a tedious and error-prone task.

Therefore, a need exists for a method and apparatus to automatically modify the logical relationships of the failed device with the new device identifier.

SUMMARY OF THE INVENTION

The present invention is generally directed to a method of managing logical relationships between SAN devices, such as HBAs, switches, arrays, bridges and the like. The method is configured to receive a unique identifier of a first device and replicate the logical relationships of the first device to the second device. Logical relationships are generally defined to include zones, LUN masks, LUN bindings, virtual storage area networks (VSAN's), trunking ports and the like.

In one embodiment, the method is a software program that is invoked when the program receives an identifier associated with the first device. Upon receipt of the identifier, the program determines the logical relationships associated with the first device and prompts the user with the new unique identifier associated with the second device. Upon receipt of the new unique identifier of the second device, the program associates the new unique identifier to the logical relationships associated with the first device. The program may use a proprietary communication tool to associate the new unique identifier to the logical relationships. Subsequently, the identifier associated with the first device may be deleted from the logical relationships associated with the first device.

In another embodiment, the program may be stored in the SAN management server. In yet another embodiment, the program may be stored outside of the SAN management server and operates independently from the SAN management server.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
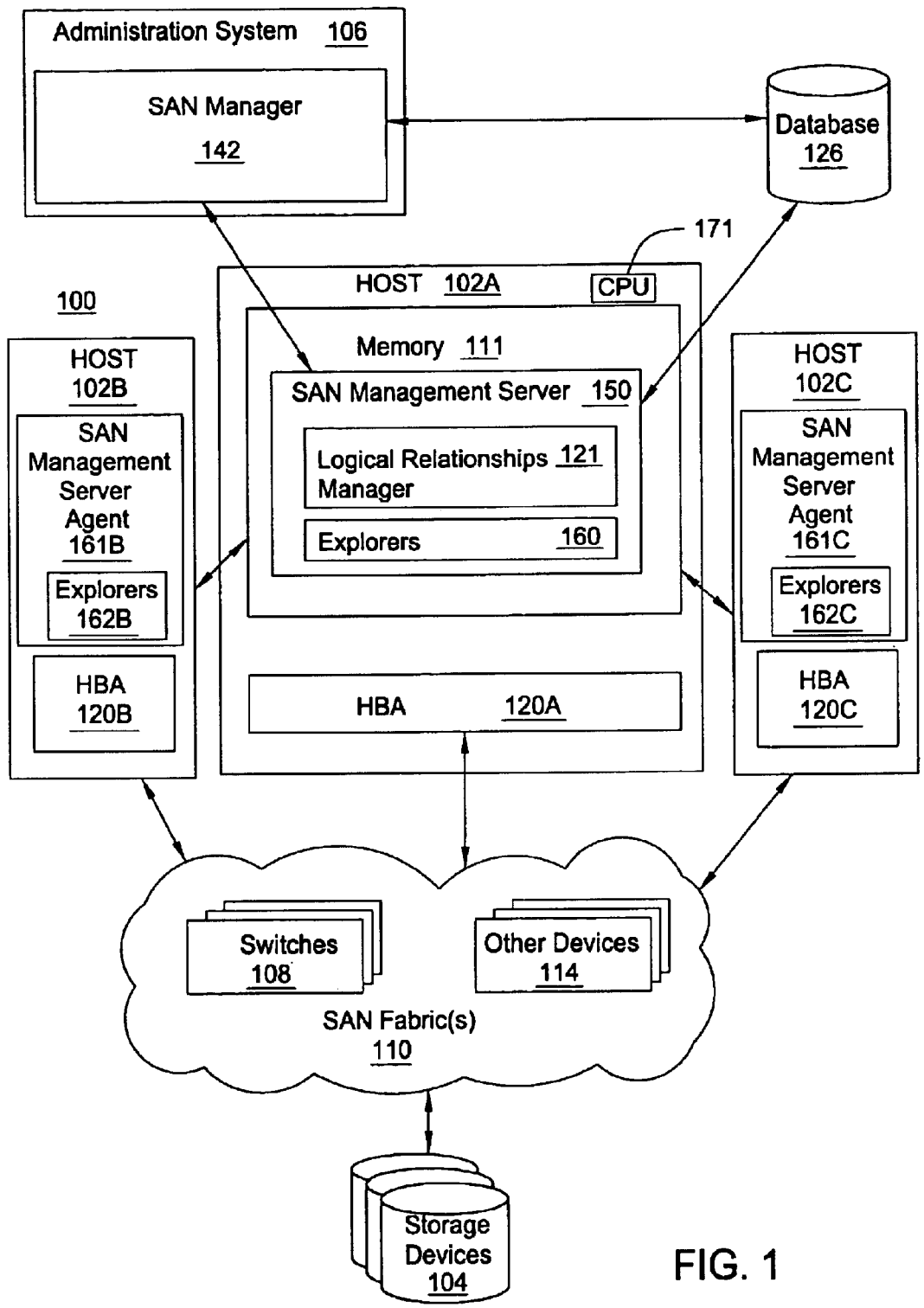
FIG. 1 illustrates an exemplary storage area network (SAN) in accordance with one embodiment of the invention.

FIG. 1 illustrates an exemplary storage area network (SAN) 100 in accordance with one embodiment of the invention. Although embodiments of the inventions are described herein with reference to the SAN 100, embodiments of the invention may contemplate other network based storage configurations, such as iSCSI, NAS and the like. The SAN 100 includes one or more hosts (e.g., host 102A, 102B and 102C), one or more storage devices 104, and one or more SAN fabrics 110. Host 102 includes a SAN management server 150 stored therein. The SAN management server 150 is communicably linked to a SAN administration system 106, which includes a SAN manager 142 stored therein, a central database 126, host 102B and host 102C. The SAN management server 150 is also communicably linked to the storage devices 104 through the SAN fabrics 110. The aforementioned components will now be described in greater details.

The SAN 100 may be based on a distributed client-server architecture. The SAN 100 may also be described as a high-speed, special-purpose network that interconnects storage devices 104 with associated data servers, e.g., hosts 102A, 102B and 102C, on behalf of a larger network of users. The SAN 100 may employ Fiber Channel technology. One or more end-user platforms (not shown) may access the SAN 100, typically via a LAN or WAN connection to one or more of the hosts 102.

Host 102A may be referred to as a central system, while hosts 102B and 102C may be referred to as remote systems. Each host includes at least one processor, e.g., CPU 171, which is electrically connected to a memory, e.g., memory 111. Memory 111 may comprise random access memory, read only memory, removable disk memory, flash memory, and various combinations of these types of memory. Memory 111 is sometimes referred to as main memory and may in part be used as cache memory or buffer memory. Memory 111 may store various software packages, such as a device logical relationships manager 121, which will be described in detail in the following paragraphs with reference to FIG. 2. Hosts 102A–C may run on any of a variety of operating systems, including Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the SAN fabrics 110 via one or more HBAs. The SAN fabrics 110 may enable server-to-storage device connectivity through Fiber Channel switching technology and may include one or more switches 108 and other devices 114, such as bridges, hubs, routers, interconnecting cables (e.g., for Fiber Channel SANs, fiber optic cables) and the like. Storage devices 104 may include, but are not limited to, Redundant Array of Independent Disks (RAID) systems, disk arrays, JBOD's (Just a Bunch Of Disks, used to refer to disks that are not configured according to RAID), tape devices, LUN's and optical storage devices.

The SAN management server 150 is generally configured to discover SAN devices, such as hosts, HBAs, switches and storage devices, to maintain a data store of real-time object information, to manage SAN resources through zoning and logical unit number (LUN) access control, to monitor conditions on the SAN, and to perform policy-based actions in response to SAN conditions, to support user-defined and automatic grouping of objects based on quality of service (QoS) criteria, and to make data available to client applications, including the SAN manager 142. The SAN management server 150 may run on a variety of operating systems including, but not limited to Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions).

In one embodiment, the SAN management server 150 includes the device logical relationships manager 121, which is generally configured to manage logical relationships between SAN devices, such as HBAs, switches, arrays, bridges, routers, and the like. In another embodiment, the device logical relationships manager 121 may be stored outside of the SAN management server 150. Each SAN device generally has one or more logical relationships with other devices. Examples of logical relationships include zones, LUN masks, LUN binding configurations, VSAN's, VLUN's, volume DMP settings and the like. The operation of the device logical relationships manager 121 will be described in detail later in the specification with reference to FIG. 2.

Zoning is a security mechanism that is utilized to control access between devices in a SAN fabric. By creating and managing zones, the user may control host access to storage resources. The access restrictions created by zones in the SAN are enforced by a number of methods. These methods include soft zoning and hard zoning. Soft zoning, also called advisory zoning, is enforced simply by filtering the visibility of devices in the SAN so that a device can only see other devices that share at least one zone membership with the device. In hard zoning, a Fiber Channel switch actively blocks access to zone members from any devices outside the zone. This is performed at the level of ports on the switch. Hard zoning may also be referred to as switch port zoning.

Some zoning methods support switch zoning through application program interfaces (APIs) provided by switch vendors, allowing for both hard and soft zoning. As such, the SAN manager 142 serves as a centralized point from which a user may access SAN management system and/or third-party services, tools, applications, and/or utilities to create and manage zones in the SAN, including zones containing heterogeneous SAN devices. Currently, no industry-wide standard exists for zoning, and different vendors' switches may implement switch zoning in different ways. Consequently, one method may use a switch-neutral approach to zoning. Another may provide a zone utility that facilitates the creation, modification, and deletion of zones. The zone utility provides storage zone definition, creation and management. The zone utility is used to administer zones directly and visually, thereby reducing or removing the need to use telnet commands or proprietary, hardware-specific Web-based solutions. The zone utility may also automatically filter the list of devices in the SAN and present a list of devices that are available to be added to a zone.

A LUN is the SCSI (Small Computer System Interface) identifier of a logical unit within a target, which is the system component that receives a SCSI I/O command. A logical unit is an entity within a SCSI target that executes I/O commands. SCSI I/O commands are sent to a target and are executed by a logical unit within that target. A SCSI physical disk typically has a single logical unit. Tape drives and array controllers may incorporate multiple logical units to which I/O commands can be addressed.

LUN security is the collective name given to the operations involved in making storage devices 104 available to hosts 102 on the SAN 100, and may include LUN locating or searching, LUN binding, LUN masking, and fabric zoning. LUN security provides granular control over a host's 102 access to individual LUN's within an array or other collection of potentially heterogeneous storage devices. LUN binding is generally defined as the creation of access paths between LUN's within a disk array and ports on the array. LUN masking is generally defined as enabling access to LUN's for host HBA ports. Fabric zoning is generally defined as allowing the host to see the Addressable Units and create a device handle for it.

The SAN management server 150 maintains a real-time topology of the SAN 100 by discovering devices in the SAN 100 and the logical relationship of these devices to each other. In addition, the SAN management server 150 directly interfaces with switches in the SAN fabrics 110 to manage the zoning of storage resources. In this manner, the SAN management server 150 discovers additional information about devices that the SAN management server 150 cannot discover directly, such as devices in a separate zone.

The SAN management server 150 may also include one or more explorers 160, which are configured to gather inform ation for the SAN management server 150. Once the information is gathered, the SAN management server 150 aggregates the gathered in formation into a data store. On ce the SAN 100 is discovered, the SAN management server 150 periodically examines the SAN 100 for devices that are added, devices that are removed, and connections that are pulled. New explorers may be added as needed or desired. For example, if a new type of SAN device is added to the SAN 100, or an existing type of SAN device is modified or upgraded, an explorer may be added or updated to correctly communicate with the new or updated type of SAN device.

Explorers 160 may use different methods to discover information about heterogeneous SAN devices. For example, explorers may query devices in the SAN 100 to retrieve a standard set of attributes for each type of device. The terms "information" and "details" may be used to describe the different kinds of data about a SAN that may be discovered, including SAN events, zone memberships, connectivity, storage faults, and the like. The term "attributes" refers to a subset of that larger body of information. Attributes are details that are particular to a type of device, such as a volume—details such as its size, version, identification tags, name and quality of service. Attributes may also include other relationships such as those between file systems, volumes, disk groups, LUN's, storage enclosures, disks and quality of service.

Explorers 160 may be categorized into various types, including switch explorers, zoning explorers, disk array explorers, volume explorers, file system explorers, and HBA explorers. Volume and file system explorers are configured to discover volume and file system information, such as volume name, mount point, number of files present in the file system, total space, free space and used space. The management server explorer may use the Fiber Channel Common Transport (CT) protocol to communicate with switches in fabrics 110. The management server explorer may, for example, discover switches in-band over Fiber Channel, obtain switch characteristics, and/or explore port connectivity. The management server explorer may optionally run over IP networks. For some switches, the management server explorer may run out-of-band. The management server explorer may also perform in-band zoning.

Zoning explorers are generally used as an interface for the SAN management server 150 to communicate with fabric switches to perform discovery and control of zones in the SAN 100. When users issue zoning commands, the SAN management server 150 uses a zoning explorer to contact the switch to perform the zoning operation. As such, zoning explorers may communicate with the switches out-of-band. The zoning explorers may complete transactions with a switch management server to discover zone names and attributes and to perform switch zoning commands.

HBA explorers are generally used to discover information about SAN-connected storage devices that are zoned to a host 102 that has a SAN management server 150 or a SAN management server agent stored therein. The HBA explorer interacts with a host 102 to discover HBAs and device paths. A device path is generally defined as a route through an interconnect that allows two or more devices to communicate. As such, an HBA explorer may not discover locally attached storage (e.g. disks or other devices attached through a SCSI or IDE controller). If these storage devices have device handles, then the HBA explorer may return LUN names and attributes. A device handle is typically used by the operating system to identify a storage resource (known as an Addressable Unit, or AU), and the correct methods (e.g. driver/system call) to access the storage resource. If no device handles are available, then the HBA explorer may identify the device as a generic device (a block device attached to a port on the host).

Disk array explorers are generally used to provide information about array names and their attributes, such as number of ports and the number of disks contained in an array. Disk array explorers may also be used to discover disk arrays/enclosures and their LUN's. In doing so, disk array explorers pass LUN management commands to the array's management interface to execute. Disk array explorers may discover LUN's that are not masked to discovered hosts. The SAN management server 150 may include disk array explorers specific to disk arrays of various vendors. Disk array explorers generally start when SAN management server 150 starts. The disk array explorers also check to see if host 102A has a management interface. If host 102A does not have the management interface, the corresponding explorer may be disabled. If the management interfaces are present, the explorers may determine if host 102A has access to any LUN's exported by the array. If any LUN's are available, the explorers may attempt to discover the array using the device handle of the LUN. Further, some disk array explorers may use an out-of-band network protocol, such as SNMP, to communicate directly with the disk array controller. IP addresses for each disk array may be supplied for SAN management server discovery and communication. Additionally, the SAN management server may communicate with a disk array through the array's management interface. The array vendor's management software is generally installed on a host 102A with an in-band connection to the arrays to be managed. The management software provides a unified interface/command interpreter between the SAN management system and the arrays in the fabric.

Each remote system, e.g., hosts 102B or 102C, may have a SAN management server agent 161 to assist the SAN management server 150 in discovering the entire SAN 100. The SAN management server agent 161 generally includes one or more explorers 162. The explorers 162 may also include an out-of-band switch explorer. The SAN management server 150 and the SAN management server agent 161 may each include a set of one or more explorers that may be determined by the discovery requirements and/or contents of the region of the SAN visible to the host 102A–C in which the SAN management server 150 or the SAN management server agent resides. The SAN management server agent 161 provides information gathered by explorers to SAN management server 150, which aggregates this information into the SAN management server 150 data store. The SAN management server 150 is typically configured to communicate with SAN management server agents using various protocols to get detailed information about a remote host, such as host 102B or 102C.

As mentioned above, the administration system 106 includes the SAN manager 142, which provides a central management interface for various SAN management tasks and provides a graphical user interface (GUI) for displaying the information (e.g., connectivity information between a host and a storage device) compiled by and received from the SAN management server 150 in graphical and/or textual format. The SAN manager 142 may also provide a user interface for accessing various features of the SAN management system, such as tools and utilities. The SAN management tasks may include administering the SAN, viewing topographical displays of discovered devices in the SAN, accessing detailed information on components including devices attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. The SAN manager 142 may run on any of a variety of end-user platforms coupled to the hosts 102, typically via a LAN or WAN, or alternatively may run on host 102A. Applications, such as a Web browser, may function as clients to SAN management server 150. More than one SAN manager 142 may connect simultaneously with SAN management server 150. Furthermore, the SAN 100 may include a command line interface that enables the user to query and modify SAN management server monitoring service objects, configuration settings and perform other related SAN management system tasks.

A detailed description of the operation of the device logical relationships manager 121 will now be described in the following paragraphs. The device logical relationships manager 121 may be invoked by the user for various reasons. For instance, the user may want to replace an existing SAN device with a new SAN device or another SAN device from the same host. Alternatively, the user may want one SAN device to have the same logical relationships of another SAN device.

Figure 2A:
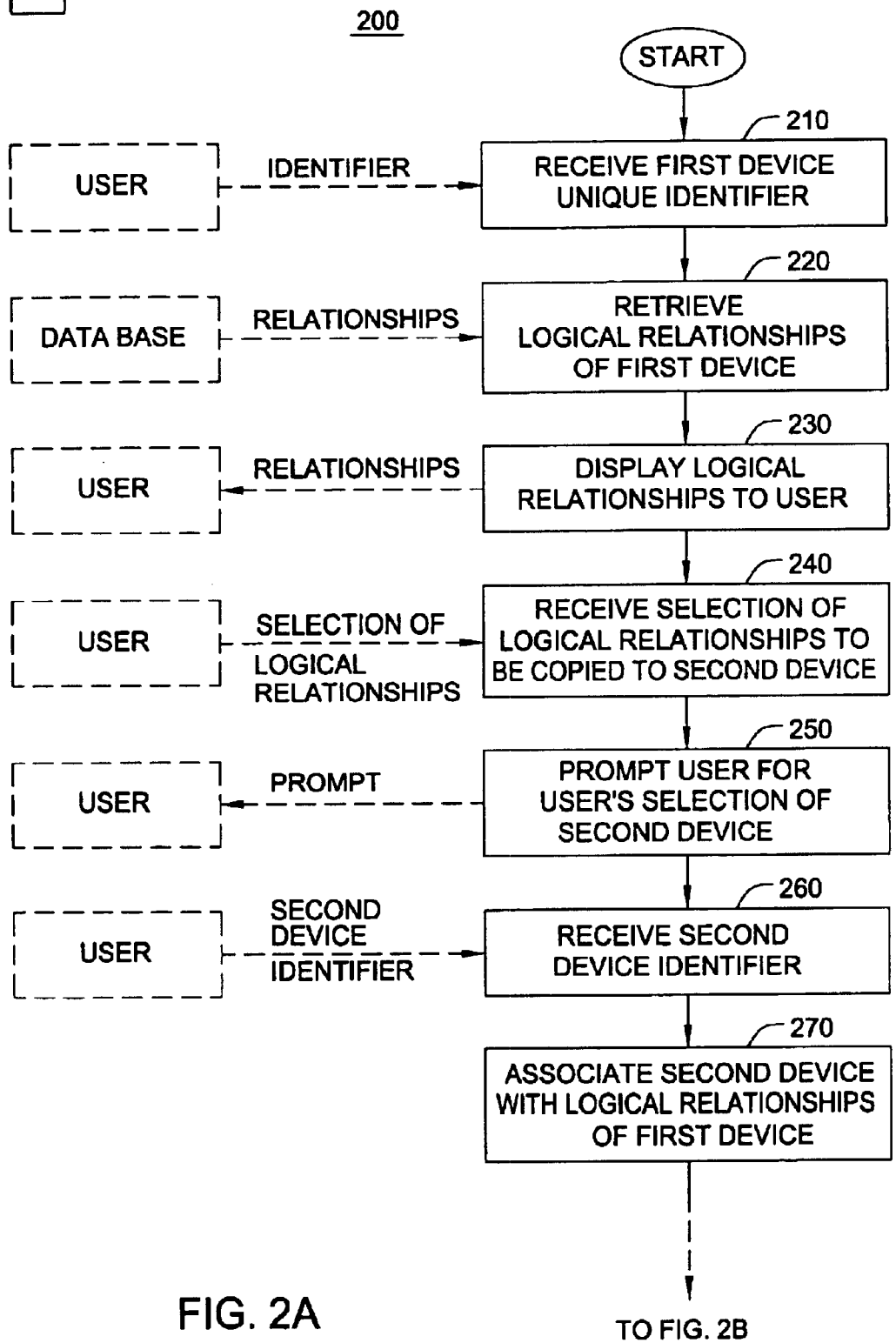
FIG. 2 illustrates a flow diagram of a method for managing logical relationships of a SAN device in accordance with one embodiment of the invention.
Figure 2B:
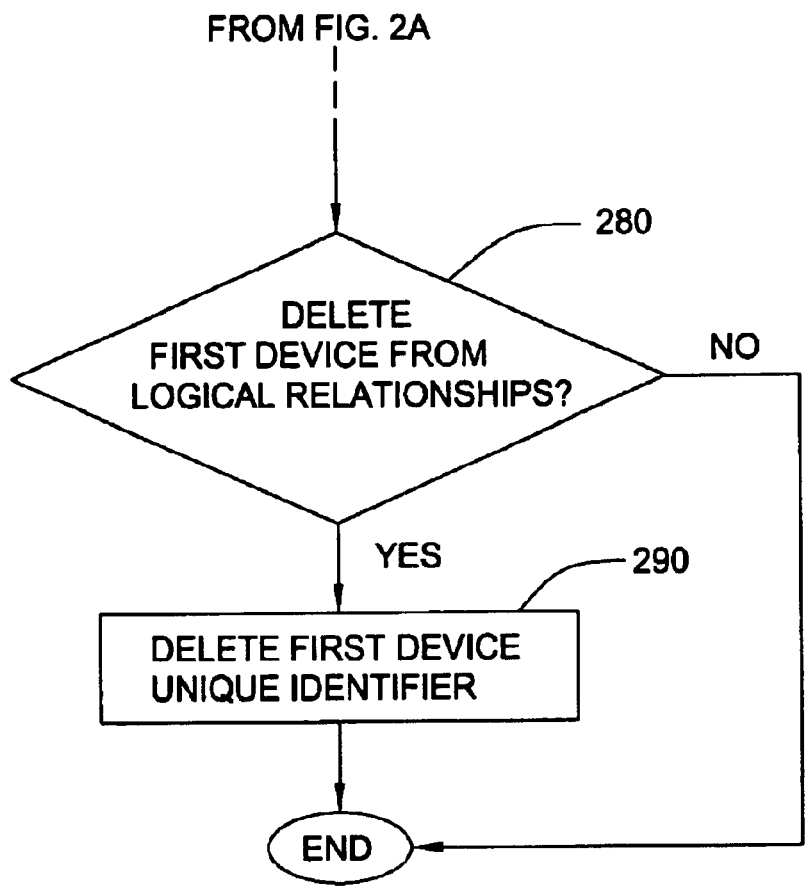

FIG. 2 illustrates a flow diagram of a method 200 for managing logical relationships of a SAN device in accordance with one embodiment of the invention. In step 210, the device logical relationships manager 121 receives a unique identifier associated with a first device, such as HBA 120A, from a user. The unique identifier may be a world wide name (WWN), an alias associated with WWN or iSCSI and the like. WWN is generally defined as a registered 64-bit unique identifier assigned to nodes and ports. Although embodiments of the invention are described with reference to a unique identifier of an HBA, embodiments of the invention contemplate unique identifiers of other SAN devices, such as switches, arrays, bridges, or ports of those SAN devices.

Upon receipt of the identifier associated with the first device, the device logical relationships manager 121 retrieves all the logical relationships associated with HBA 120A (step 220). The device logical relationships manager 121 may retrieve the logical relationships from the central database 126. The logical relationships may include all the zones and LUN masks to which the HBA 120A belong.

After the device logical relationships manager 121 retrieves all the logical relationships associated with HBA 120A, the device logical relationships manager 121 displays the logical relationships associated with the HBA 120A to the user (step 230). In one embodiment, the user may be given the option to select all of the logical relationships or a portion thereof, i.e., only a portion of the zones and LUN masks listed in the logical relationships (step 240). The device logical relationships manager 121 then prompts the user to enter a unique identifier of a second HBA configured to have the same logical relationships as HBA 120A (step 250). In one embodiment, the device logical relationships manager 121 may present the user with a list of available HBA's from which the second HBA may selected. In step 260, the device logical relationships manager 121 receives the unique identifier of the second HBA. The second HBA may be a newly installed HBA or another HBA already connected to host 102A.

In step 270, the device logical relationships manager 121 adds the unique identifier of the second HBA to each zone and LUN mask selected from the logical relationships. In one embodiment, the device logical relationships manager 121 communicates with an array communication tool to add the unique identifier of the second HBA to the LUN mask membership list stored in the array's memory or database. The array communication tool is typically a proprietary piece of software configured to specifically update the LUN masking membership list of the array. As such, the device logical relationships manager 121 may communicate with different array communication tools to configure, modify, add or delete LUN masks from different vendors. In another embodiment, the device logical relationships manager 121 communicates with a switch communication tool to add the unique identifier of the second HBA to a zone membership list stored in the switch's memory or database. Like array communication tools, the switch communication tool is typically a proprietary piece of software configured to specifically to update the zone membership list of the switch. As such, the device logical relationships manager 121 may communicate with different switch communication tools to configure or modify switch zones of different vendors. The device logical relationships manager 121 may communicate with the array or switch communication tool through the SAN management server 150.

Since the size and variety of logical relationships associated with a particular SAN device may vary, using the device logical relationships manager 121 may save the user a significant amount of time. For example, rather than updating each LUN mask and zone from possibly different arrays and switches, the user may simply use the device logical relationships manager 121 to update the selected LUN masks and zones.

In step 280, the user is presented with a prompt as to whether the unique identifier of HBA 120A should be deleted or removed from the logical relationships associated with HBA 120A, e.g., whether the unique identifier of HBA 120A should be deleted from the zones/LUN masks membership lists stored in each associated switch/array. If the answer is in the affirmative, then the device logical relationships manager 121 communicates with the respective switch/array communication tool to remove the unique identifier of HBA 120A from the zones/LUN masks membership lists stored in the switch/array (step 290). The user generally chooses this option if the user desires to replace HBA 120A with another HBA, e.g., the second HBA.

On the other hand, if the user desires to copy the logical relationships associated with HBA 120A to the second HBA, e.g., for redundancy or high availability purposes as in a server cluster environment, the user will select an answer in the negative. In this manner, both HBA 120A and the second HBA are associated with the same logical relationships. If HBA 120A fails, the second HBA can take the place of HBA 120A since the second HBA is associated with the same logical relationships, thereby allowing the SAN 100 to continue to operate.

Although embodiments of the invention are described with reference to an HBA, embodiments of the invention contemplate other SAN devices, such as a switch or an array, or a port of those SAN devices. As an example, the device logical relationships manager 121 may receive a unique identifier of a first switch port and replicate the zone memberships of the first switch port to the second switch port. As another example, the device logical relationships manager 121 may receive a unique identifier of a first switch and replicate all the logical relationships with which the first switch is associated to a second switch similar to the first switch. As yet another example, the device logical relationships manager 121 may receive a unique identifier of a first array port and replicate the LUN masks of the first array port to a second array port.

While the foregoing is directed to embodiments of the present invention, other and further embodiments of the invention may be devised without departing from the basic scope thereof, and the scope thereof is determined by the claims that follow.

What is claimed is:

1. A method for managing one or more logical relationships between a plurality of devices in a storage area network (SAN), comprising:
   receiving a first identifier associated with a first SAN device;
   determining at least one logical relationship associated with the first SAN device;
   receiving a second identifier associated with a second SAN device; and
   associating the second identifier to the at least one logical relationship associated with the first SAN device.

2. The method of claim 1, further comprising removing the first identifier from the at least one logical relationship associated with the first SAN device.

3. The method of claim 1, wherein the at least one logical relationship comprises at least one of zones, logical unit number (LUN) masks and LUN bindings.

4. The method of claim 1, wherein the first SAN device and the second SAN device comprise one of a host bus adapter, a switch and an array.

5. The method of claim 1, wherein associating the second identifier to the at least one logical relationship comprises communicating with a SAN device communication tool to associate the second identifier to the at least one logical relationship.

6. An apparatus for managing one or more logical relationships between a plurality of devices in a storage area network (SAN), comprising:
   means for receiving a first identifier associated with a first SAN device;
   means for determining at least one logical relationship associated with the first SAN device;
   means for receiving a second identifier associated with a second SAN device; and
   means for associating the second identifier to the at least one logical relationship associated with the first SAN device.

7. The apparatus of claim 6, further comprises means for removing the first identifier from the at least one logical relationship associated with the first SAN device.

8. The apparatus of claim 6, wherein the at least one logical relationship comprises at least one of zones, logical unit number (LUN) masks and LUN bindings.

9. The method of claim 6, wherein the first SAN device and the second SAN device comprise one of a host bus adapter, a switch and an array.

10. The method of claim 6, wherein means for associating the second identifier to the at least one logical relationship comprises means for communicating with a SAN device communication tool to associate the second identifier to the at least one logical relationship.

11. A storage area network (SAN), comprising:
    a first device;
    a second device; and
    a central system having a SAN management server configured to manage one or more logical relationships associated with the first device by:
       receiving a first identifier associated with the first device;
       determining at least one logical relationship associated with the first device;
       receiving a second identifier associated with the second device; and
       associating the second identifier to the at least one logical relationship associated with the first device.

12. The SAN of claim 11, wherein the first device and the second device comprise one of a host bus adapter, a switch and an array.

13. The SAN of claim 11, wherein the SAN management server is configured to remove the first identifier from the at least one logical relationship associated with the first device.

14. The SAN of claim 11, wherein the at least one logical relationship comprises at least one of zones, logical unit number (LUN) masks and LUN bindings.

15. The SAN of claim 11, wherein the first device and the second device comprise one of a host bus adapter, a switch and an array.

16. The SAN of claim 11, wherein associating the second identifier to the at least one logical relationship comprises communicating with a SAN device communication tool to associate the second identifier to the at least one logical relationship.

17. A system, comprising:
    a processor; and
    a memory comprising program instructions, wherein the program instructions are executable by the processor to:
       receive a first identifier associated with a first device;
       determine one or more logical relationships associated with the first device;
       receive a second identifier associated with a second device; and associate the second identifier to the logical relationships associated with the first device.

18. The system of claim 17, wherein the first device and the second device comprise one of a host bus adapter, a switch and an array.

19. The system of claim 17, wherein the program instructions are further executable by the processor to remove the first identifier from the logical relationships associated with the first device.

20. The system of claim 17, wherein the logical relationships comprise at least one of zones, logical unit number (LUN) masks and LUN bindings.

* * * * *